Apr. 24, 1923.

W. B. HADLEY

BAKER'S IMPLEMENT

Filed March 13, 1922

1,452,504

Inventor

Walter B. Hadley

By Ithiel J. Cilley

Attorney

Patented Apr. 24, 1923.                                            1,452,504

UNITED STATES PATENT OFFICE.

WALTER B. HADLEY, OF GRAND RAPIDS, MICHIGAN, ASSIGNOR TO CARRIE B. HADLEY, OF GRAND RAPIDS, MICHIGAN.

BAKER'S IMPLEMENT.

Application filed March 13, 1922. Serial No. 543,216.

*To all whom it may concern:*

Be it known that I, WALTER B. HADLEY, a citizen of the United States, residing at Grand Rapids, in the county of Kent and State of Michigan, have invented certain new and useful Improvements in Bakers' Implements, of which the following is a specification.

My invention relates to improvements in tools for placing bread loaves, pies, cakes, etc., into bake ovens, and its objects are: first, to provide an implement that may be readily adjusted to any reasonable variation of widths of baking tins; second, to provide a means whereby the two leaves of the implement will be held securely, but slidably together, and, third, to provide a means whereby the sides of the tins will be contacted by the edge rims of the implement so they will be held safely in the implepent when placing or removing them.

Figure 1:
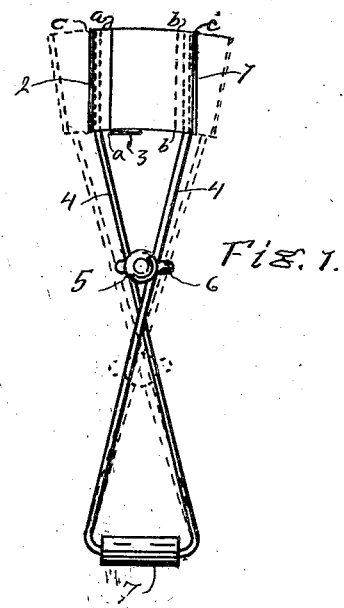
Figure 2:
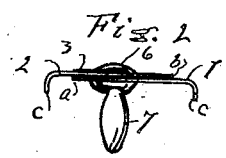
Figures 3, 4:
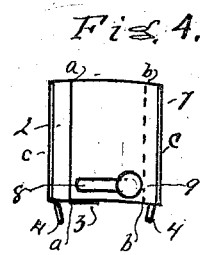
Figure 5:
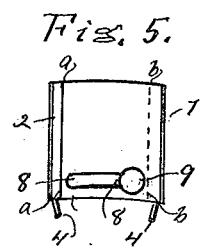

I attain these objects by the arrangement and construction of parts shown in the accompanying drawing, in which Fig. 1 is a plan of the implement showing its lateral adjustment in outline. Fig. 2 is a front end view of the implement. Fig. 3 is an edge view of the upper leaf, and a sectional view of the lower leaf showing the manner of adjustably securing the two leaves together so there can be no separation of the two leaves vertically. Fig. 4, is a plan of the shovel end of the implement showing two means provided for preventing vertical separation of the leaves, and Fig. 5 is a like view showing the fold 3 of Figs. 1 and 2 dispensed with and a rivet and slot only, provided for holding the leaves from vertical separation.

Similar reference characters indicate similar parts throughout the several views.

In the construction of this implement I make use of two leaves, 1 and 2, the leaf 1 being placed above, and immediately upon the upper surface of the leaf 2, and the two leaves overlapping each other as indicated by the lines *a—a* and *b—b* with the outer edges of said leaves turned upwardly, as at *c*, to form side bearings against the edges or sides of the tins. Each of these leaves is mounted upon one end of a spring handle 4—4 that is provided with a hand grip 7, for handling the outer ends of the handle, the arms, 4, 4 of which are crossed near their longitudinal centers and have an adjusting handle 5 and loop 6 mounted thereon in such a manner that when the said handle and loop are shoved forward into the position indicated by their solid lines in Fig. 1 the leaves 1 and 2 will be slid together to their narrowest form, but if the handle and loop is drawn backwardly toward the position indicated by their dotted lines, the handles 4, 4 will spring apart and carry the leaves outwardly in position to widen the shovel part of the implement, as indicated by their dotted lines in Fig. 1.

It is, of course, necessary that some means be provided to prevent the leaves that form the shovel part of the implement from separating, vertically, and for this purpose I have provided two distinct devices: first, I find that a very satisfactory and economical means is to turn a parallel lip, as 3, from the back edge of the upper leaf 1 downwardly and forwardly under the lower leaf 2 with sufficient clearance to allow the two leaves to move freely, yet not too loosely. I, also, find that the use of a rivet in the lower leaf and a slot in the upper lip, as represented at 9 and 8 in Fig. 5, is a very effective and satisfactory means, and even the combination of the two, as in Fig. 4, proves very satisfactory.

When operating this implement the sliding hand grip 5 is drawn backwardly into the position, or practically the position indicated by its dotted outlines in Fig. 1 so the two leaves may move laterally apart, when the shovel part is passed under the tin to be removed from the oven, the sliding hand grip is moved forwardly until the sides *c c* press snugly against the sides of the bake tin, when it is drawn backwardly by means of the hand grip 7 and the baked goods removed from the oven and deposited where desired, the bake tin being released by again drawing backwardly upon the handles 4, as hereinbefore suggested.

When the rivet 9 is used it will render it impossible to draw the leaves 1—2 apart laterally.

Having thus fully described my invention, what I claim as new in the art, is:

1. In a baker's implement, a shovel made of two leaves arranged for lateral adjustment, said leaves mounted upon the ends of spring constructed handles integral at the outer end and crossed midway between the outer end and the shovel leaves, and means for adjusting the width of the shovel to correspond with the width of the baking pan to be handled with the implement.

2. In a baker's implement, laterally adjustable leaves forming a shovel, said leaves mounted upon the ends of spring constructed arms, said arms integral at the outer end and crossed near the longitudinal centers, and a sliding handle and loop so mounted upon the handles that its longitudinal adjustment thereon will cause the shovel part to widen or narrow laterally.

3. In a baker's implement, a shovel part made of two overlapping leaves, each of said leaves secured to the end of a two pronged handle, said handle integral at one end, the shovel leaves bent upwardly at right angles at the outer edges, means for holding said leaves together for a free sliding movement laterally, one upon the other, the handles of said implement crossed near their longitudinal center, and a sliding handle and loop for varying the width of the shovel part of the implement.

4. In a baker's implement, a wire bent to form integral arms crossed near their longitudinal center, a sheet metal leaf secured to each arm of said handle, a hand grip at the connected end of said handle, a sliding hand grip and loop mounted upon the handles for longitudinal movement thereon wherewith the leaves may be made to recede or be drawn together for varying the width of the shovel, the outer rims of said leaves bent upwardly, and a part of one leaf bent over the edge of the other leaf forming a groove for the free movement of the other leaf laterally therein, and means for preventing the leaves from being drawn out of surface contact with each other, or from being drawn out of contact with each other laterally.

Signed at Grand Rapids, Michigan, March 2, 1922.

WALTER B. HADLEY.